United States Patent
Tian et al.

(10) Patent No.: US 8,588,086 B2
(45) Date of Patent: Nov. 19, 2013

(54) REVERSE LINK DATA RATE INDICATION FOR SATELLITE-ENABLED COMMUNICATIONS SYSTEMS

(75) Inventors: Bin Tian, San Diego, CA (US); Ahmad Jalali, Rancho Santa Fe, CA (US); Srikant Jayaraman, San Diego, CA (US); June Namgoong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 12/627,946

(22) Filed: Nov. 30, 2009

(65) Prior Publication Data
US 2011/0128866 A1 Jun. 2, 2011

(51) Int. Cl.
*G01R 31/08* (2006.01)
*H04B 1/00* (2006.01)
*H04B 1/38* (2006.01)
*H04B 7/15* (2006.01)
*H04L 5/16* (2006.01)

(52) U.S. Cl.
USPC .......... 370/252; 370/315; 375/130; 375/219; 455/11.1

(58) Field of Classification Search
None
See application file for complete search history.

(56) References Cited

U.S. PATENT DOCUMENTS

| | | | | |
|---|---|---|---|---|
| 5,912,921 A | * | 6/1999 | Warren et al. | 375/220 |
| 6,094,427 A | * | 7/2000 | Yi | 370/331 |
| 2001/0005406 A1 | | 6/2001 | Mege et al. | |
| 2003/0193907 A1 | * | 10/2003 | Rezaiifar et al. | 370/329 |
| 2004/0218559 A1 | * | 11/2004 | Kim et al. | 370/318 |
| 2006/0209970 A1 | | 9/2006 | Kanterakis | |

FOREIGN PATENT DOCUMENTS

| | | |
|---|---|---|
| EP | 1073302 A1 | 1/2001 |
| EP | 1130837 A2 | 9/2001 |
| EP | 1168700 A2 | 1/2002 |
| EP | 1458118 A1 | 9/2004 |
| WO | WO0139449 A1 | 5/2001 |

OTHER PUBLICATIONS

International Search Report and Written Opinion—PCT/US2010/058247, International Search Authority—European Patent Office—Mar. 11, 2011.

\* cited by examiner

*Primary Examiner* — Xavier Wong
(74) *Attorney, Agent, or Firm* — Jeffrey D. Jacobs

(57) ABSTRACT

Reverse link data rate indications in wireless communication systems are defined with low identification overhead. Existence of a pilot signal is leveraged in order to reduce the overhead for identifying and selecting the reverse link data rate. At least two distinguishable pilot signals are defined, in which, based on the particular pilot signal present in the transmitted frame, at least one rate set from the multiple available rate sets can be determined. Reverse rate information in the transmitted frame is then used to identify which specific data rate within the determined rate set is used. Based on the identified data rate, the receiver may then decode the payload data in the transmitted frame.

26 Claims, 9 Drawing Sheets

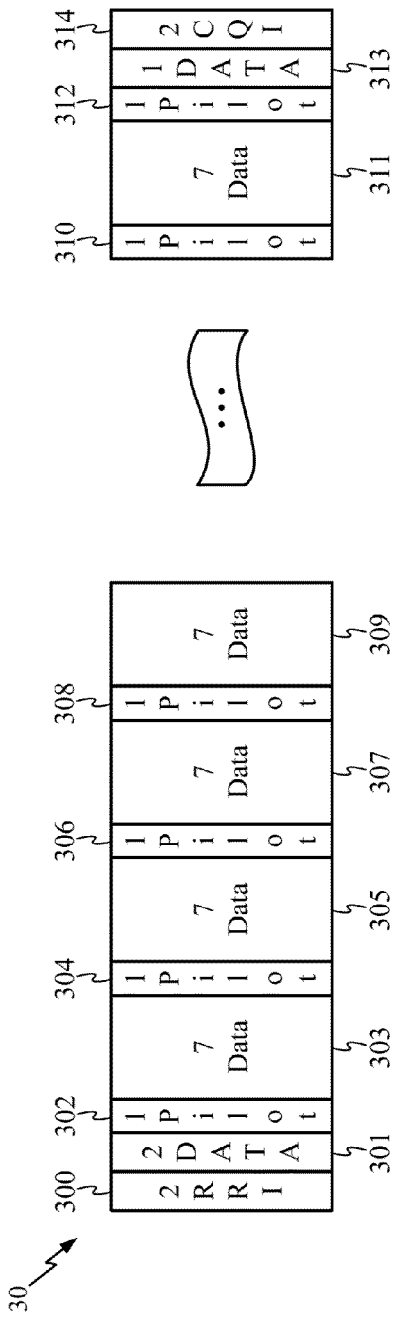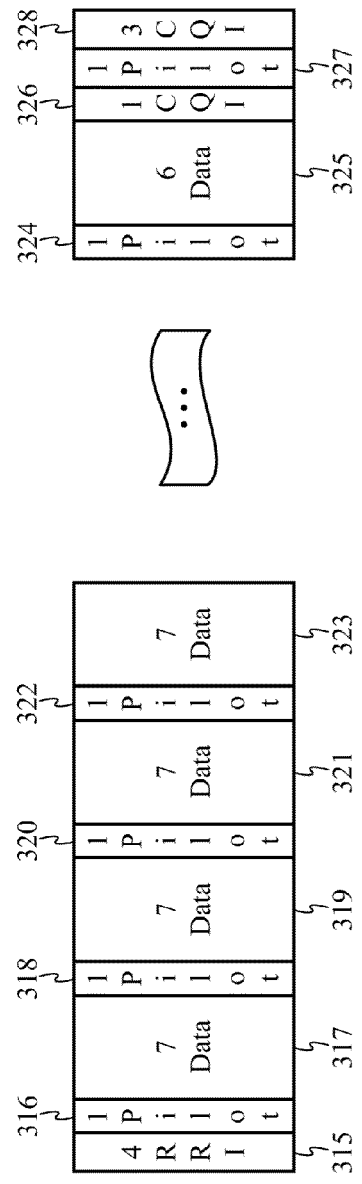
FIG. 3A
FIG. 3B

REVERSE LINK DATA RATE INDICATION FOR SATELLITE-ENABLED COMMUNICATIONS SYSTEMS

TECHNICAL FIELD

The present teachings relate, in general, to communications systems and, more particularly, to reverse link data rate indications in satellite-enabled communication systems.

BACKGROUND

Many current wireless communication systems involve wireless cellular networks. These networks are generally terrestrial radio frequency (RF) networks made up of a number of cells each served by at least one fixed-location transceiver known as a base station. These base stations provide wireless communication links with various mobile devices or user equipment (UE) that pass through the cell served by the particular base station. Advances in terrestrial RF systems have allowed enormous growth and accessibility of wireless voice and data communication to the population and because of the various standardized wireless protocols, the costs for providing such wireless services and user equipment is relatively low.

One shortcoming of wireless cellular networks is coverage area. In order to maximize the serviceable capacity of any given cell area, the fixed-location base stations are configured to have only a certain, limited range. The limited range allows for reuse of the available channels, which increases the overall capacity of the network. Because a fixed-location base station is used to provide wireless access to the communication system, there can be no service where no base station exists. Moreover, various terrain features, such as trees, mountains, buildings, and the like, can block the RF signals or prohibit installation of the base stations, thus, effectively reducing coverage areas. Therefore, in remote locations, where base stations would be impossible or impracticable to place, a mobile device or user equipment becomes effectively a paper-weight have complex, but still quite useless electronics while in the no-coverage area.

In order to address some of the coverage limits, personal satellite communication systems have been developed. While satellites have been used in backend or backbone communication transmissions for many years, use for personal communication systems has only more recently been implemented. In such satellite systems, a satellite phone or satellite communication device acts as a type of mobile phone that connects to orbiting satellites instead of terrestrial cell sites. Depending on the architecture of a particular system, coverage may include the entire Earth, or only specific regions.

Satellite communication systems experience some of the same shortcomings as terrestrial communication systems, such as signals being blocked by trees, buildings, and the like. However, a satellite communication system can typically provide communication access in extremely remote locations, as long as the location is visible to a certain number of orbiting satellites. Thus, where a terrestrial communication system would typically fail to provide access in the middle of the ocean, or particular desert or mountain range, a satellite communication system will generally provide communication through signals communicated directly between the UEs and one or more orbiting communication satellites.

While terrestrial wireless communication systems have taken off and become very widespread around the world, satellite communication systems have failed to enjoy similar success likely because of the large initial start up costs for the communication companies to deploy the requisite number of satellites into orbit and, for the user, because of the relatively high costs of the associated mobile devices/UEs, as well as high usage costs, sometimes adding up to several U.S. dollars per minute. However, as wireless technology has advanced, it has become feasible to share mobile hardware for processing both terrestrial and satellite communications. Moreover, hybrid terrestrial-satellite communication systems have been suggested that provide for a mobile phone or user equipment to use terrestrial base stations when practical, but then switch to satellite stations when the mobile phone or user equipment is no longer be able to reliably couple to the terrestrial base station.

One issue that arises in pure satellite or hybrid terrestrial-satellite systems is adapting the various terrestrial wireless standards to satellite operations. Adaptation of these standards allows more of the same user equipment technology to be used, "as is," or with only slight changes in order to be compatible between both the terrestrial and satellite systems. Fewer or no changes equates to lower costs for and higher access to the satellite systems. Problems often arise, however, in adapting the terrestrial standards to satellite operations because satellites are simply much further away from the average user than a terrestrial base station. The sheer distance affects satellite signals through signal strength and long roundtrip delays. Weaker signals equate to lower data rates, and satellite roundtrip delays are around 500 ms compared to terrestrial roundtrip delays which are typically less than 1 ms.

BRIEF SUMMARY

The various embodiments of the present teachings are directed to reverse link data rate indications in wireless communication systems. Existence of a pilot signal is leveraged in order to reduce the overhead for identifying and selecting the reverse link data rate. At least two distinguishable pilot signals are defined, in which, based on the particular pilot signal present in the transmitted frame, at least one rate set from the multiple available rate sets can be determined. Reverse rate information in the transmitted frame is then used to identify which specific data rate within the determined rate set is used. Based on the identified data rate, the receiver may then decode the payload data in the transmitted frame.

Additional representative embodiments of the present teachings are directed to methods for transmitting reverse link data rate information in a wireless communication system. These methods include determining a data rate for reverse link transmission and selecting a first pilot signal from at least two distinguishable pilot signals, wherein the selected first pilot signal differentiates at least one rate set from a group of rate sets, where the differentiated rate set includes the determined data rate. The methods further include deriving a rate code that identifies the determined data rate, assembling a reverse link frame using at least the first pilot signal and the derived rate code, and transmitting the reverse link frame to an access node of the wireless communications system.

Further representative embodiments of the present teachings are directed to methods for decoding reverse link data transmissions in a wireless communication system. These methods include receiving a frame transmitted by a mobile device, detecting a pilot signal within the frame, and differentiating, based on the detected pilot signal, at least one of several available rate sets. The methods further include decoding reverse rate information within the frame, selecting a data rate within the differentiated rate set based on the decoded reverse rate information, and decoding data within the frame according to the selected data rate.

Still further representative embodiments of the present teachings are directed to access nodes for a wireless communication system. These access nodes are made up of a processor, a modulator/demodulator coupled to the processor, a transceiver coupled to the processor, an antenna array coupled to the transceiver, and a storage memory coupled to the processor. A rate detection module is stored in the storage memory. When executed by the processor, the rate detection module configures the access node to detect a pilot signal in a received frame and to identify at least one rate set associated with the detected pilot signal. The access nodes also include a decoder module stored in the storage memory. When executed by the processor, the decoder module further configures the access node to decode the reverse rate information in the received frame. The executing rate detection module further configures the access nodes to identify a data rate within the rate set(s) using the decoded reverse rate information and decode data within the frame using the identified data rate.

Still further representative embodiments of the present teachings are directed to computer-readable media including program code stored thereon. The computer-readable media include program code to receive a frame transmitted by a mobile device, program code to detect a pilot signal within the frame, and program code to differentiate, based on the detected pilot signal, at least one of several available rate sets. The computer-readable media also include program code to decode reverse rate information within the frame, program code to select a data rate within the differentiated rate set based on the decoded reverse rate information, and program code to decode data within the frame according to the selected data rate.

Still further representative embodiments of the present teachings are directed to systems for decoding reverse link data transmissions in a wireless communication system. These systems include means for receiving a frame transmitted by a mobile device, means for detecting a pilot signal within the frame, and means for differentiating, based on the detected pilot signal, at least one of several available rate sets. These systems further include means for decoding reverse rate information within the frame, means for selecting a data rate within the differentiated rate set based on the decoded reverse rate information, and means for decoding data within the frame according to the selected data rate.

The foregoing has outlined rather broadly the features and technical advantages of the present invention in order that the detailed description that follows may be better understood. Additional features and advantages will be described hereinafter which form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the technology of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following description taken in conjunction with the accompanying drawings.

FIG. 3A is a block diagram illustrating a frame configured according to one embodiment of the present teachings.

FIG. 3B is a block diagram illustrating a frame configured according to one embodiment of the present teachings.

DETAILED DESCRIPTION

Figure 1:
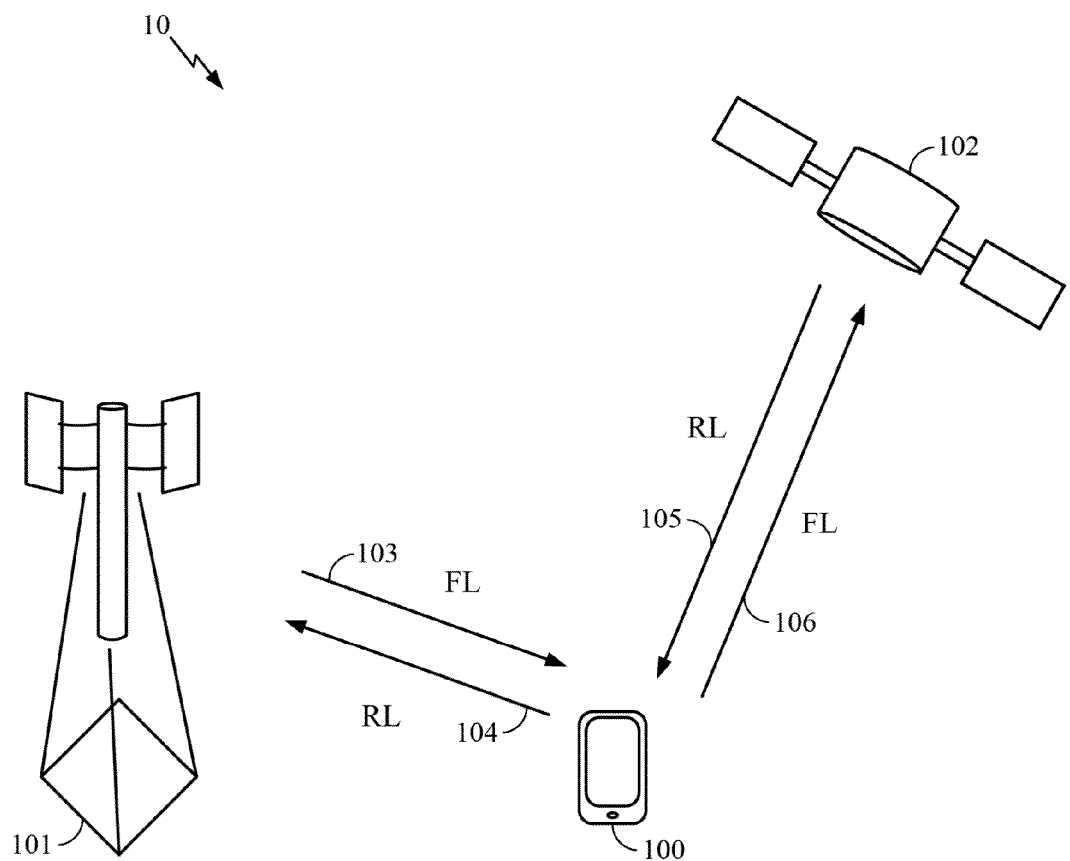
FIG. 1, a block diagram is shown illustrating an exemplary hybrid terrestrial-satellite communication system (HCS) in which an embodiment of the present teachings may be employed.

Turning now to FIG. 1, a block diagram is shown illustrating an exemplary hybrid terrestrial-satellite communication system (HCS) 10 in which an embodiment of the present teachings may be employed. The hybrid terrestrial-satellite communication system 10 includes multiple access networks arranged in such a manner so as to provide multiple adjacent terrestrial cells defined by multiple, geographically spaced terrestrial base stations in addition to multiple access beam patterns provided by multiple orbiting satellites. The illustrated portion of the hybrid terrestrial-satellite communication system 10 in FIG. 1 presents only one of the many terrestrial base stations making up the hybrid terrestrial-satellite communication system 10, the terrestrial base station 101, and only one of the many orbiting satellites making up the hybrid terrestrial-satellite communication system 10, the satellite 102.

An access terminal (AT) 100 establishes communication with the hybrid terrestrial-satellite communication system 10 through radio frequency (RF) signals exchanged between the terrestrial base station 101 and/or the satellite 102. These components of hybrid terrestrial-satellite communication system 10 communicate through two-way signaling. The terrestrial base station 101 communicates to access terminal 100 through forward link (FL) 103, and receives returning communication from the access terminal 100 through reverse link (RL) 104. Because of the manner in which the individual cells are configured in the hybrid terrestrial-satellite communication system 10, the terrestrial base station 101 is not located very far away from the access terminal 100, at least relative to the distance of the satellite 102. The relative short distance between the access terminal 100 and the terrestrial base station 101 results in short round trip delay times in communications over the FL 103 and the RL 104. When transitioning to accessing the hybrid terrestrial-satellite communication system 10 through the satellite 102, the access terminal 100 again communicates with satellite 102 using FL 106 and RL 105 transmission. However, because of the distance between the access terminal 100 and the hybrid terrestrial-satellite communication system 10, round trip delays may be substantially higher than that experienced in terrestrial communications.

The potential for satellite and hybrid terrestrial-satellite communication systems becomes greater as the physical specifications for adapting satellite communications are refined. One set of specifications being considered is the GEO mobile satellite air interface (GMSA) currently under development by Qualcomm, Inc. The GMSA protocol defines a set of standards for controlling and managing the air interface between mobile devices and satellite base stations or access networks. These protocols are specifically adapted to deal with the unique conditions that are present when communicating with orbiting earth satellites.

One of the new specifications being proposed by the GMSA protocol is a narrowband physical layer for return link (RL) communications. This narrowband physical layer is specifically designed for the power-limited satellite communication systems. Several key features of this narrowband physical layer play an important role in defining efficient and reliable communications.

The RL traffic channel is defined to use a narrowband physical layer with frequency division multiplexing (FDM) of the accessing users. A 1.23 megaHertz (MHz) block of RL spectrum is divided into 192 narrowband frequency channels with each of these channels having a bandwidth of 6.4 kiloHertz (kHz). Depending on the frequency re-use pattern, channel availability, and system load, an accessing user may be assigned one or two individual FDM channels for RL traffic. Considering the size of the satellite beam and typical frequency re-use pattern, two users will not typically be assigned to the same frequency channel. Thus, accessing users within the same beam will generally not interfere with each other.

This flexibility to assign up to two channels per accessing user allows for efficient servicing of a variety of mobile device types. For example, a typical accessing user with a basic mobile device may only be capable of transmitting at rates between 2.4 and 4.8 kilobits per second (kbps) while still maintaining an adequate link margin. For such available transmission rates, a transmission bandwidth any larger than 6.4 kHz provides only negligible benefits. In contrast, a mobile device that has a larger transmitter power budget and/or a high-gain antenna may be able to tolerate a reduced link margin and, therefore, be able to transmit at rates as high as between 19.2 and 38.4 kbps. Forcing such higher transmission rates into a 6.4 kHz bandwidth is very inefficient. In fact, spreading the transmit power for such higher data rates over a larger band can often achieve 1-2 decibels (dB) more efficiency from a coding and modulation perspective. Thus, assigning two individual channels (12.8 kHz total bandwidth) to higher data rate users when possible can increase overall efficiency for such users.

The reverse traffic channel currently supports ten different data rates (i.e., 0 or null rate, 640 bps, 1.28 kbps, 2.4 kbps, 4.8 kbps, 9.6 kbps, 12.8 kbps, 19.2 kbps, 25.6 kbps, and 38.4 kbps). Keeping each data rate separately administered by the system causes the use of more overhead for directly dealing with each specific rate. Instead of keeping each rate separate, the GMSA groups the data rates into multiple rate sets. In its current status, the ten supported data rates are grouped into three rate sets: Rate Set 0 (640 bps and 1.28 kbps), Rate Set 1 (2.4 kbps, 4.8 kbps, and 9.6 kbps), and Rate Set 2 (12.8 kbps, 19.2 kbps, 25.6 kbps, and 38.4 kbps). The GMSA standards provide for using a different one of these rate sets for transmitting low bit-rate voice/signaling messages than for transmitting high rate packet data. Moreover two different encoding methods or schemes which may be optimized for differently sized packets are available. For example, in a small payload packet having a size, such as 48 or 96 bits, a standard encoding scheme, such as an efficient tailbiting convolution code, may be used. A tailbiting convolution code is a common coding example as it has been adopted as a standard for North American digital cellular radio communications. It is known in the art as IS-130, as adopted by the International Telecommunication Union. However, it should be noted that other types of coding schemes may also be used in the small payload cases. In contrast, larger payload packets may use more complex coding schemes, such as trellis codes or turbo codes.

The GMSA standards also have defined a narrowband access channel. The process of searching a spread spectrum signal having a low signal to interference plus noise ratio (SINR) and a large delay variation within a satellite beam can be an extremely challenging task. For example, the continental United States (CONUS) may be covered using a 36 satellite beam pattern, in which the diameter of each beam as measured on the Earth's surface is roughly 500 kilometers (km). In order to cover all of the access attempts by users at different locations within this 500 km beam diameter, the gateway's access channel search window would need to be approximately 3 milliseconds (ms). This size search window would translate into about 3687 chips for each 1.25 MHz spread spectrum signal. In contrast, selecting the narrowband access and traffic channels of 6.4 kHz reduces the delay uncertainty window to around 17 symbols for a 5.6 kHz symbol rate. It also allows for a larger beam width and very low access channel data rates, which are commonly present in satellite communications, yet difficult to otherwise support using a code division multiple access (CDMA) spread-spectrum approach.

One protocol that offers beneficial adaptation to satellite communication systems is the evolution-data optimized (EVDO) standard for the wireless transmission of data through radio signals developed by Qualcomm, Inc. It uses multiplexing techniques including CDMA, as well as time division multiple access (TDMA) to maximize both individual user throughput and the overall system throughput. It is standardized by the 3rd Generation Partnership Project 2 (3GPP2) as part of the CDMA2000 family of standards and has been adopted by many mobile phone service providers around the world—particularly those previously employing CDMA networks.

One of the benefits with the EVDO standard is the ability to adjust transmission data rates based on the forecasted quality of the transmission channels. Part of this mechanism for controlling the data rates comes through the reverse traffic channel. In a typical terrestrial 1x EVDO system, the reverse link channels use orthogonal coding, such as Walsh codes, which are transmitted back to the base station for decoding using a quadrature phase-shift key (QPSK) modulation. However, considering the power limitations and large delay variations common with satellite communication systems, the process used in the terrestrial EVDO system does not offer the most efficient manner in which to implement reverse link rate control into satellite communications.

Figure 2:
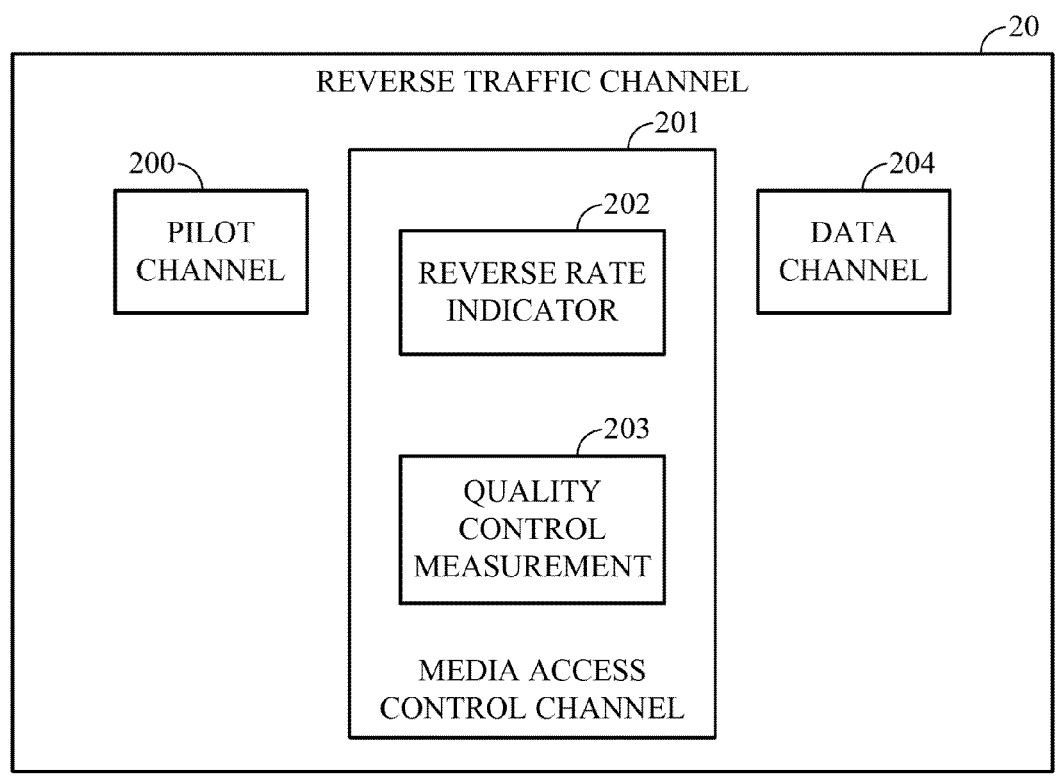
FIG. 2 is a block diagram illustrating the structure of the reverse traffic channel (RTC) used in a satellite communication system configured according to one embodiment of the present teachings.

FIG. 2 is a block diagram illustrating a structure of a reverse traffic channel (RTC) 20 used in a satellite communication system configured according to one embodiment of the present teachings. The RTC 20 includes a division of different sub-channels, each of which carries specifically tasked data or signal information. The RTC 20 includes a pilot channel 200. A demodulator at the receiving device (not shown) uses the pilot channel 200 for phase/gain estimation and tracking purposes. A media access control (MAC) channel 201 includes two sub-channels, a reverse rate indicator (RRI) channel 202 and a quality control measurement (QCM) index 203. One example of the QCM index 203 is a channel quality indicator (CQI) used for identifying the quality of a particular forward link channel. Based on this quality index, a device may select an appropriate forward link data rate that the quality will reliably support. These two sub-channels carrying information used in setting the rates at which a satellite-enabled mobile device, such as the access terminal 100 (FIG. 1) and a satellite access node (AN), such as the satellite AN 102 (FIG. 1) communicate. The RRI channel 202 identifies the data rate that the transmitting mobile device or user equipment is transmitting on the RL. Each frame making up a given packet of information will contain the same RRI information on the RRI channel 202. This repetition of the same RRI information is used by the receiver in the process of determining the exact data rate of the incoming information. The QCM index 203 indicates to the satellite access network the data rate that the mobile device or the user equipment is able to receive over the forward link (FL). Finally, the RTC 20 includes a data channel 204 which carries the data payload over the RL. Each of the pilot channel 200, RRI channel 202, QCM index 203, and data channel 204 are modulated using time division multiplexing (TDM) into the RTC 20.

A packet is a logical unit for transmitting data. Information or data is transmitted by breaking it into variously sized packets, which are then transmitted over the communication network. The basic unit of transmission time on the RTC 20 is a frame. Each frame lasts 20 ms and carries pilot symbols, data symbols, RRI symbols, and QCM index symbols in accordance with the configuration of the RTC 20. The symbols have the same duration and are transmitted at the same power level. A single packet may contain enough information such that multiple frames would be used to transmit the entire packet of information. Therefore, depending on the size of the information packet, the packet may be transmitted using one or more frames.

FIG. 3A is a block diagram illustrating a frame 30 configured according to one embodiment of the present teachings. With one FDM channel assigned having a bandwidth of 6.4 kHz, the frame 30 includes 112 complex in-phase/quadrature (I/Q) symbols over the 20 ms duration. This symbol-to-frame ratio results in a symbol rate of 5.6 kHz. The various symbols are arranged in time as illustrated in the frame 30. The frame 30 begins with a block of two RRI symbols 300 followed by a block of two data symbols 301. 14 blocks of single pilot symbols are then alternated with 13 blocks of seven data symbols. For purposes of simplicity and convenience the 14 single-pilot symbol blocks are abbreviated as the single-pilot symbol blocks 302, 304, 306, 308, 310, and 312, and the 13 seven-symbol data blocks are abbreviated as seven-symbol data blocks 303, 305, 307, 309, and 311. The 14$^{th}$ single-pilot symbol block 312 is followed by a single data symbol block 313, with the frame 30 ending in a block of two CQI symbols 314. This configuration is known by the receiver, which uses the known configuration to decode the various individual symbols. The receiver knows to expect the first two symbols to be RRI symbols, the next two symbols to be data symbols, and so on.

When a particular UE is capable of using two FDM channels and the satellite network is available to assign two such FDM channels to the UE, the bandwidth of the combined frame is now 12.8 kHz leading to a frame having 224 complex I/Q symbols, i.e., twice the bandwidth of frame 30. FIG. 3B is a block diagram illustrating a frame 31 configured according to one embodiment of the present teachings. With twice the bandwidth, the frame 31 carries twice the symbols, i.e., 224 symbols. These 224 symbols are divided and arranged in the same basic configuration as frame 30 (FIG. 3A). The duration of each symbol in the two-FDM channel frame 31 is reduced by a factor of two from that in the single-FDM channel case of frame 30 (FIG. 3A). However, the total number of symbols for each type has also been doubled. Therefore, the overall duration of the frame 31 remains invariant compared with the duration of the frame 30 (FIG. 3A) even though the overall capacity of the frame 31 is two times that of the frame 30 (FIG. 3A).

The frame 31 begins with a block of four RRI symbols 315. This configuration is, again, known by the receiver, which uses the known configuration to decode the various individual symbols. 27 blocks of single pilot symbols are then alternated with 26 blocks of seven data symbols. For purposes of simplicity and convenience the 27 single-pilot symbol blocks are abbreviated as the single-pilot symbol blocks 316, 318, 320, 322, and 324, and the 26 seven-symbol data blocks are abbreviated as seven-data symbol blocks 317, 319, 321, and 323. A final block of six data symbols 325 follows the 27$^{th}$ single-pilot symbol block 324. The six-data symbol block 325 is then followed by a block of one CQI symbols 326 and another single-pilot symbol block 327. The frame 31 ends with a block of three CQI symbols 328.

It should be noted that the framing configurations presented in FIGS. 3A and 3B are merely examples of a framing configuration that may be utilized in various embodiments of the present teachings. Additional configurations may be used without deviating from the scope of the present teachings. For example, in additional and/or alternative embodiments of the present teachings, a single-FDM channel case may divide its frames by beginning and ending with a block of 12 data symbols and alternating blocks of four symbols, divided between three pilot symbols and either one RRI symbol or one CQI symbol, with blocks of 24 data symbols. In a similar system to the systems of FIGS. 3A and 3B, these blocks would be arranged to total 112 symbols in a 20 ms frame. The double-FDM channel case would follow the same configuration with the exception of doubling the particular symbols in each block while reducing the symbol duration by a factor of two to maintain a 20 ms frame, but instead having twice the bandwidth with 224 symbols.

Most current wireless communications systems are designed to have the pilot signal present in every signal. It is used as a known signal in the network that is used to facility coherent modulation. Therefore, the demodulator at the receiver knows what to expect for the pilot symbols transmitted in the RL frames. In existing systems, there is a single pilot symbol which consists, generally, of 24 continuous binary value "0s." However, in order to reduce the overhead in handling the multiple rate sets defined in the GMSA standards, the various embodiments of the present teachings define at least two distinct pilot symbols. Because the pilot signal is intended to always be present, its existence offers a free bit or more of information. By defining at least two distinct pilot signals/symbols, the various embodiments of the present teachings are able to define at least two possible values for that information.

In the presently considered GMSA standards, along with various embodiments of the present teachings, two distinguishable pilot signals are defined. The first pilot symbol is a standard pilot symbol referred to as the normal pilot. The normal pilot can be the same configuration as existing pilot symbols, i.e., 24 continuous binary value "0s." The second pilot is configured to be 24 distinguishably different binary values from the normal pilot. This second pilot is referred to as a marked pilot. The configuration of this marked pilot will depend on the particular embodiment of the present teachings. Example configurations would include 24 alternating binary values, such as alternating as 0 and 1 or 1 and 0, or the like. These two distinguishably different pilot symbols provide a bit that can be used to differentiate or select between Rate Set 1 and Rate Set 2. For example, in one embodiment of the present teachings, when the marked pilot is detected at the receiver, the receiver knows that the current data rate falls within Rate Set 2. The RRI symbols from the remaining information in the frame are then used to select the specific data rate within the particular rate sets.

Where a communicating mobile device has been assigned a single FDM channel, the possible rate sets are limited to Rate Set 0 and Rate Set 1. In this case, because of the lower available data rates the pilot may not be strong enough to reliably carry the rate set information. In such case, the receiver, instead, uses blind detection to separate between the two rate sets. Once the appropriate rate set is discovered, the receiver of a single FDM channel frame will then use the RRI symbols to identify the exact rate within either Rate Set 0 or Rate Set 1. Because there are only two different rates within Rate Set 0, only one RRI bit is used, whereas two RRI bits are used to detect the three different rates within Rate Set 1. When Rate Set 0 is identified, the single RRI bit is repeated in the frame in order to maintain compatibility with the other rate sets and the frame structure.

It should be noted that in various embodiments of the present teachings, in operation, due to the link budget limitations, the data rates within Rate Set 0 and Rate Set 1 cannot reliably be identified based on a single frame. Therefore, when attempting to identify the specific rates within Rate Set 0 and Rate Set 1, the receiver uses both blind detection and some form of combination techniques, such as coherent combining, of the RRI symbols over all of the frames in a multi-frame packet in order to resolve identification of the data rates. Coherent combination is a common technique used to increase the reliability of symbol detection. As each symbol is received, the receiver saves the symbols and combines those symbol values with the values in the same symbol that is received in the next frame. The combination is performed in such a way so as to cancel out the noise and interference apparent in each signal. With each successively received version of the same symbol, the receiver will be able to further cancel the noise and interference and, thereafter, more reliably determine what the correct symbol values are.

It should be noted that while coherent combination is identified as one type of combinational method, other types, including non-coherent combination techniques may also be used without departing from the scope of the present teachings.

Figure 4:
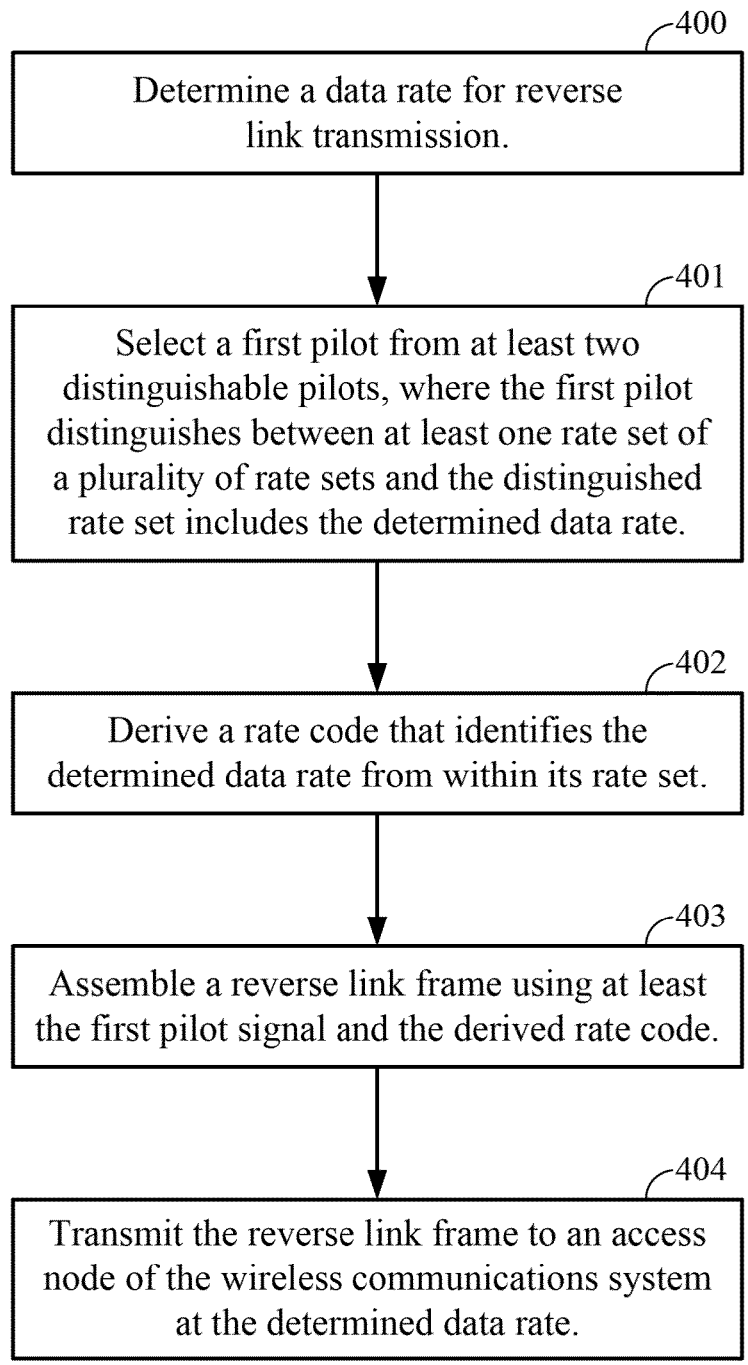
FIG. 4 is an operational block diagram illustrating example operation blocks implemented in one embodiment of the present teachings.

FIG. 4 is an operational block diagram illustrating example operation blocks implemented in one embodiment of the present teachings. In block 400, a data rate for reverse link transmission is determined. A first pilot is selected, in block 401, from at least two distinguishable pilots, where the first pilot distinguishes between at least one rate set of a group of rate sets and the distinguished rate set includes the determined data rate. A rate code is derived, in block 402, that identifies the determined data rate from within its rate set. A reverse link frame is assembled, in block 403, using at least the first pilot signal and the derived rate code. In block 404, the reverse link frame is transmitted to an access node of the wireless communications system at the determined data rate.

Figure 5:
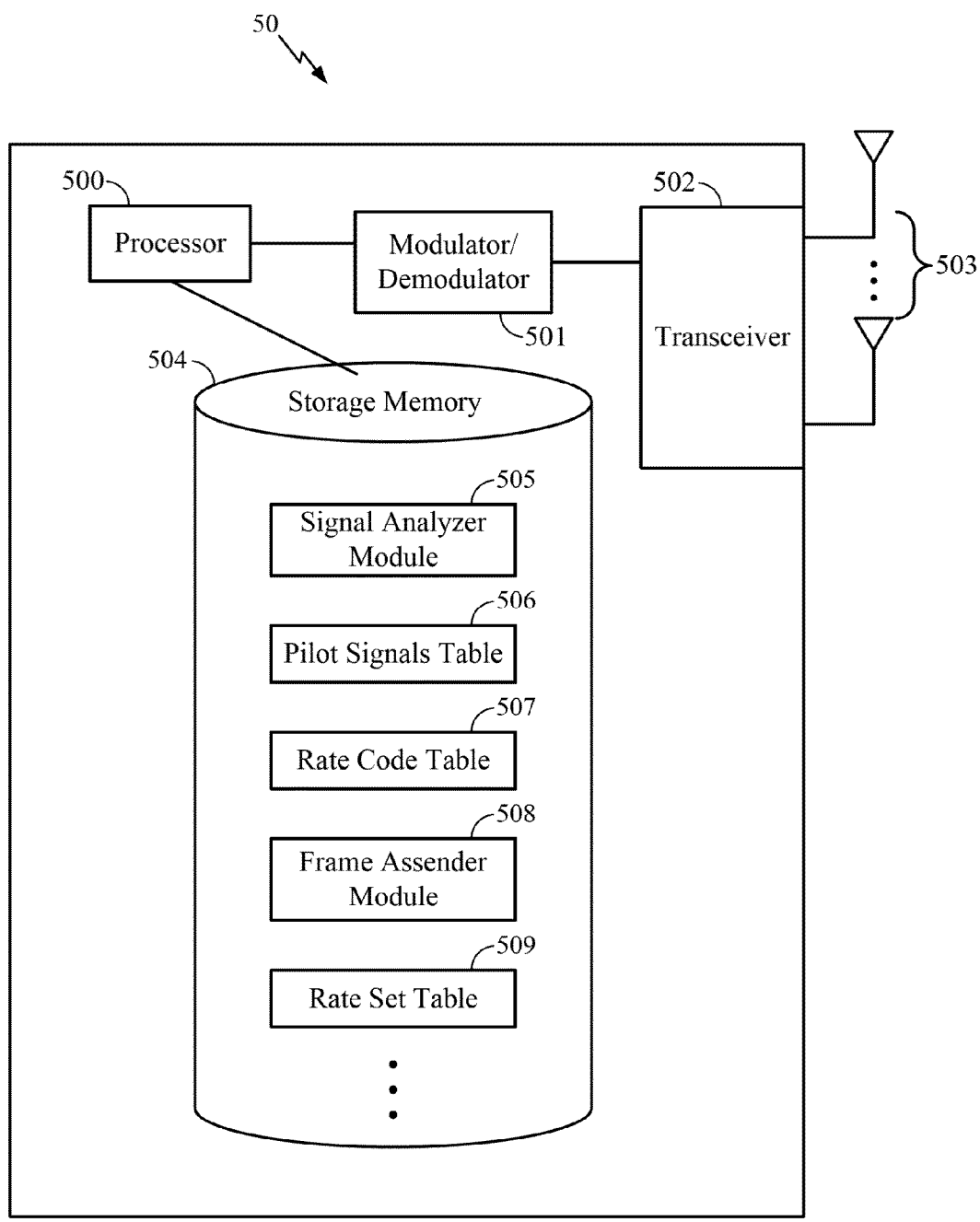
FIG. 5 is a block diagram illustrating an access terminal (AT) configured according to one embodiment of the present teachings.

FIG. 5 is a block diagram illustrating an access terminal (AT) 50 configured according to one embodiment of the present teachings. The access terminal 50 includes a processor 500, a modulator/demodulator (mo/dem) 501, a transceiver 502, which operates in conjunction with an antenna array 503, and a storage memory 504. The processor 500 is coupled, either directly or indirectly, to the mo/dem 501, the transceiver 502, the antenna array 503, and the storage memory 504, and controls the operation of these constituent parts to facilitate the functionalities of the access terminal 50. A signal analyzer module 505 is stored on the storage memory 504. When executed by the processor 500, the signal analyzer module 505 performs signal analysis on the reverse link channel using various signal-to-noise measurements. Based on these channel measurements, the executing signal analyzer selects an appropriate data rate that the quality of the reverse link channel will support in a future reverse link transmission. The projected channel quality is determined using known prediction processes based on the current quality measurements.

The storage memory 504 also stores a frame assembler module 508. When executed by the processor 500, the frame assembler module 508 gathers the appropriate data to assemble into a frame that will be transmitted to an access node (AN), whether a terrestrial AN or a satellite AN. Based on the data rate that was previously selected, the executing frame assembler module 508 accesses a rate set table 509, stored on storage memory 504, to select the particular rate set that the selected data rate falls into. Once the specific rate set is known, the executing frame assembler module 508 accesses a pilot signals table 506, also stored on storage memory 504, to determine which of the pilot signals in the pilot signals table 506 is associated with the rate set that was selected. The executing frame assembler module 508 accesses a rate code table 507, stored on storage memory 504, to determine which rate code corresponds to the selected data rate within the rate set. An example of a rate code is the reverse rate indicator (RRI) information used in various third generation (3G) wireless communication networks. The receiver of the eventual frame will use this rate code as reverse rate information in order to select the particular data rate from the identified rate set. The executing frame assembler module 508 then assembles a frame using at least the associated pilot signal and rate code, and transmits this frame to the appropriate access node at the selected data rate. If additional frames are to be transmitted, either as a part of the same packet of information or for new information packets, the process is repeated for the new frame.

Figure 6:
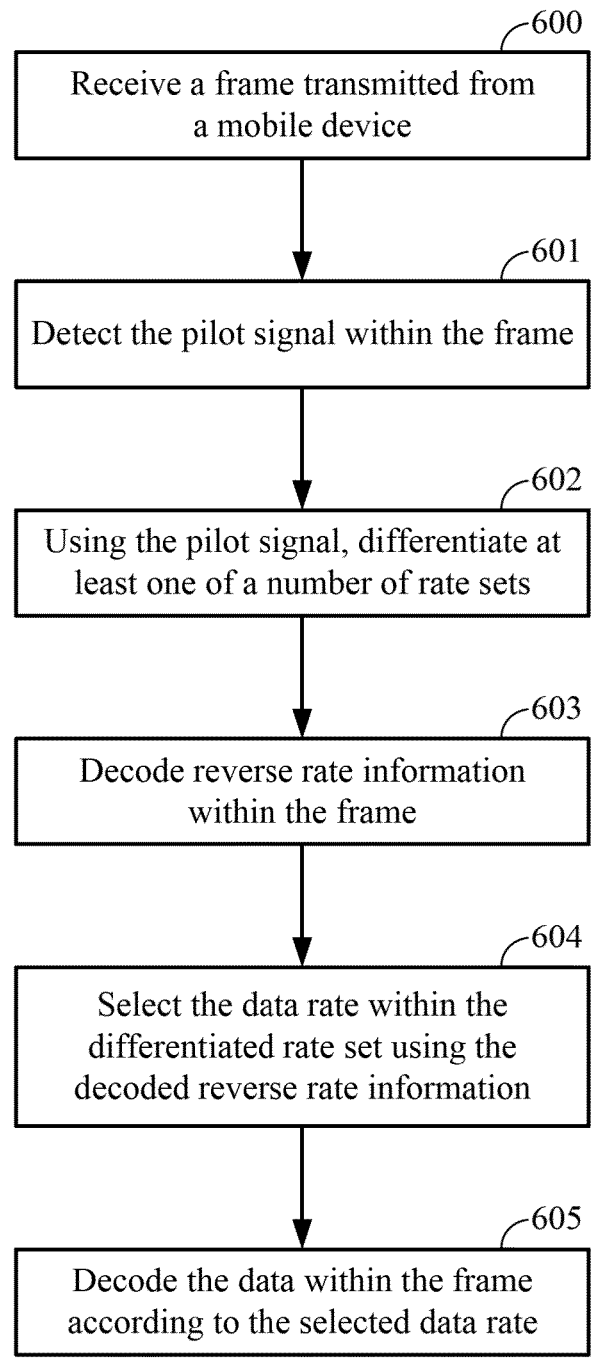
FIG. 6 is an operational block diagram illustrating example operational blocks implemented in one embodiment of the present teachings.

Once a mobile device, such as the access terminal 50 transmits a frame configured according to the embodiment of the present teachings illustrated in FIG. 5, a receiving access node will receive the frame and begin processing. FIG. 6 is an operational block diagram illustrating example operational blocks implemented in one embodiment of the present teachings. In block 600, a frame, transmitted from a mobile device, is received. The pilot signal is detected, in block 601, within the frame. The pilot signal is used, in block 602, to differentiate at least one of a number of rate sets. The reverse rate information within the frame is decoded in block 603. The data rate is selected, in block 604, within the differentiated rate set using the decoded reverse rate information. In block 605, the data within the frame is decoded according to the selected data rate.

Figure 7:
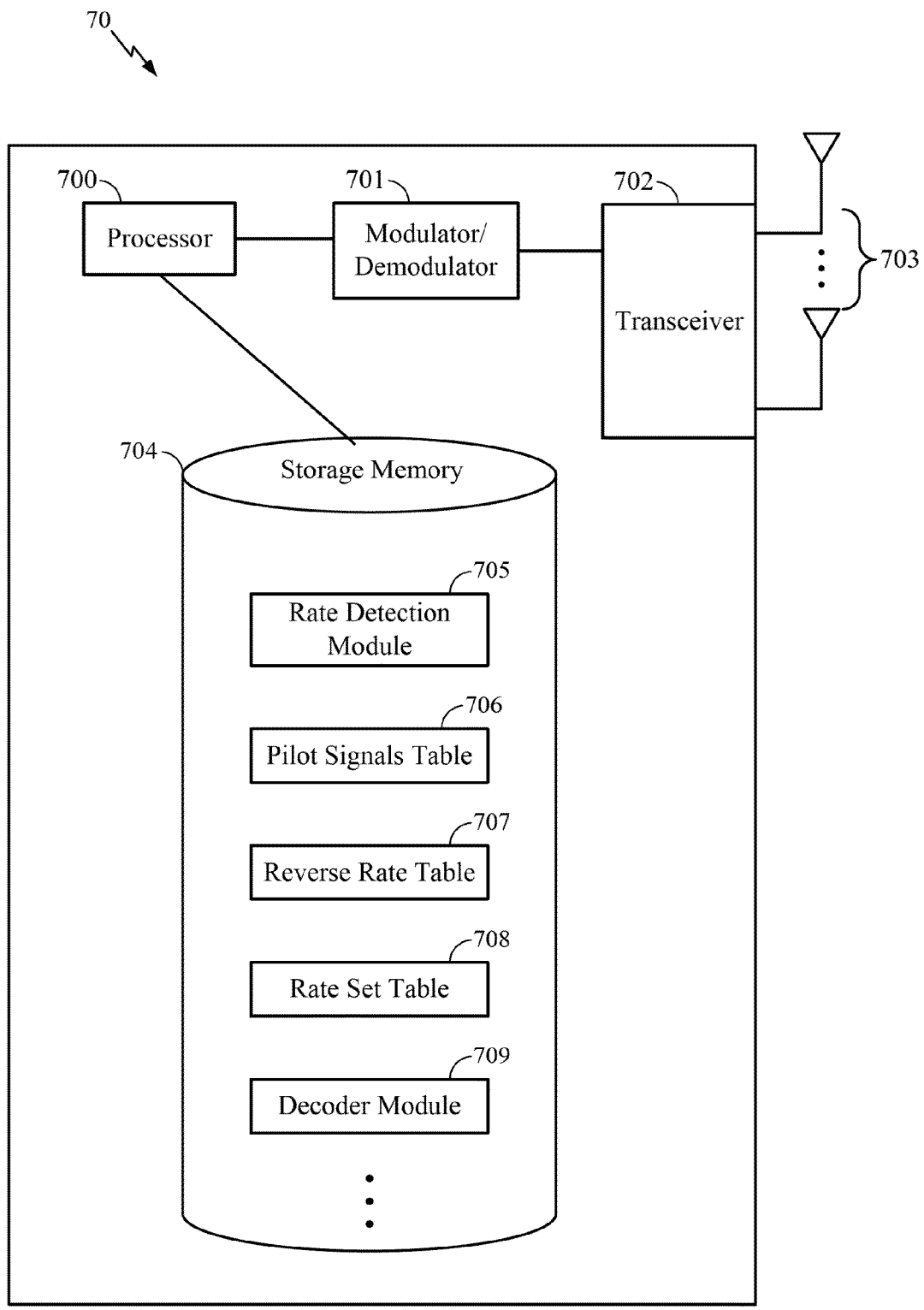
FIG. 7 is a block diagram illustrating an access node (AN) configured according to one embodiment of the present teachings.

FIG. 7 is a block diagram illustrating an access node (AN) 70 configured according to one embodiment of the present teachings. The access node 70 includes a processor 700, a modulator/demodulator (mo/dem) 701, a transceiver 702, which operates in conjunction with an antenna array 703, and a storage memory 704. The processor 700 is coupled, either directly or indirectly, to the mo/dem 701, the transceiver 702, the antenna array 703, and the storage memory 704, and controls the operation of these constituent parts to facilitate the functionalities of the access node 70. The access node 70 may be any type of access node, including a terrestrial node or a satellite node.

A rate detection module 705 is stored on storage memory 704. When executed by the processor 700, the rate detection module 705 processes a received frame from an associated mobile device. The executing rate detection module 705 analyzes the received frame for its pilot signal. Using a pilot signals table 706 stored on storage memory 704, the executing rate detection module 705 determines which rate set, within which the data rate of the received frame is located, is associated with the particular detected pilot signal.

The storage memory 704 also stores a decoder module 709, which, when executed by the processor 700, is used to decode reverse rate information found in the transmitted frame. When the reverse rate information appears to be reliable, the executing rate detection module 705 accesses a reverse rate table 707 and a rate set table 708, both stored on the storage memory 704, to select the particular data rate within the identified rate set. Once the data rate is established, the executing decoder module 709 uses the identified data rate to decode the information from within the frame.

Figure 8:
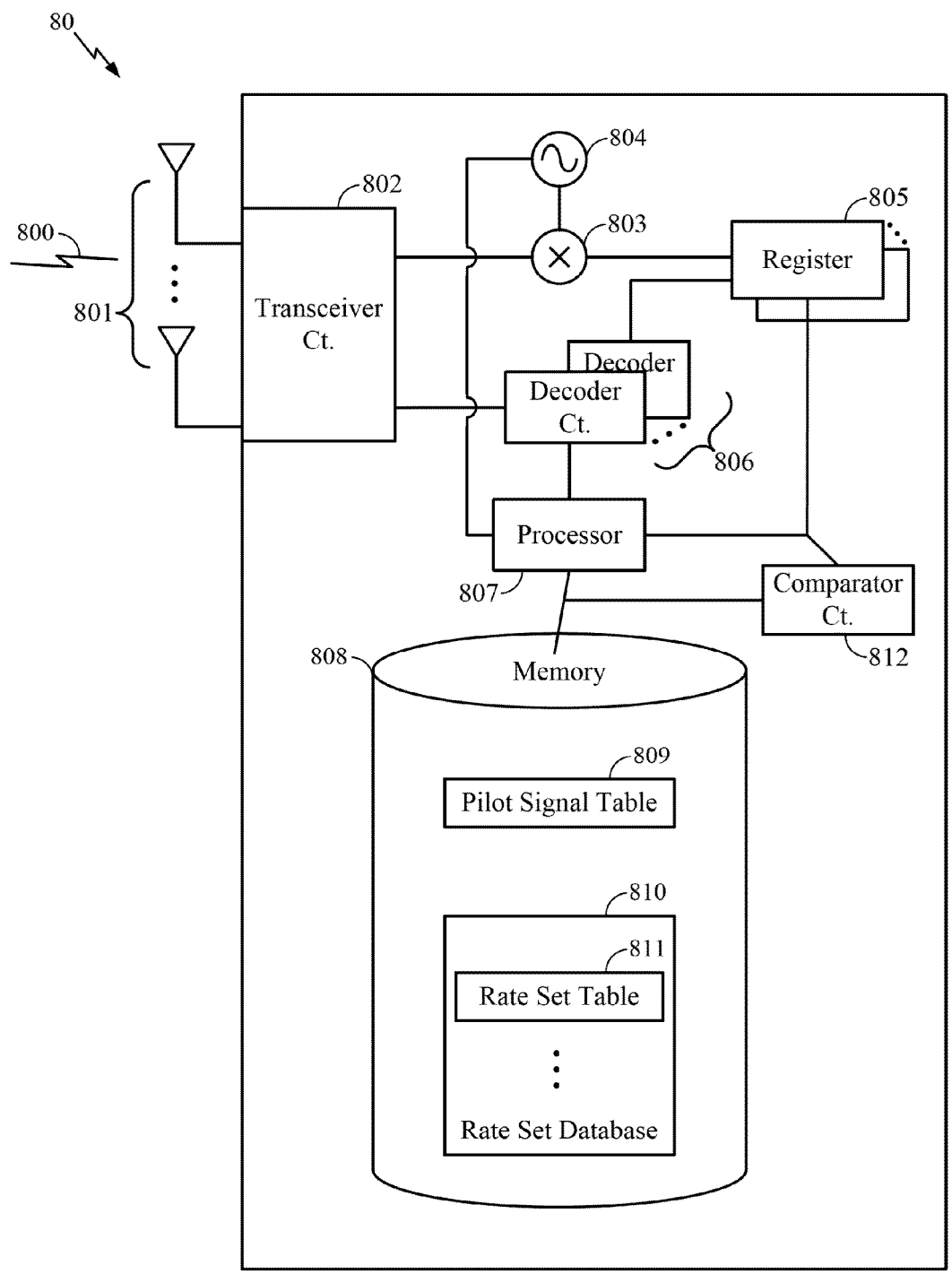
FIG. 8 is a block diagram illustrating an access node (AN) configured according to one embodiment of the present teachings.

FIG. 8 is a block diagram illustrating an access node 80 configured according to one embodiment of the present teachings. The access node 80 performs its operations according to the embodiment of the present teachings through a combination of hardware and software components. For example, as wireless frame signal 800 is transmitted through the air. These RF signals of the wireless frame signal 800 collide with a hardware antenna array 801 resulting in various patterns of electrical current and/or voltage running through the antenna array 801, such patterns comprising the received wireless frame signal 800. A transceiver circuit 802 detects and amplifies the electrical signals present on the antenna array 801 and passes the conditioned wireless frame signal 800 to a mixer 803. The mixer 803 modulates the signal for the pilot signal within the wireless frame signal 800 by mixing the wireless frame signal 800 with a particular reference signal from a signal generator 804. The particular reference signal is known to produce the pilot signal when mixed with a transmission signal from the network.

After the mixer 803 produces the pilot signal, the pilot signal is stored in one of several registers 805. A processor 807 accesses the registers 805 to retrieve the pilot signal and uses a comparator circuit 812 to compare the detected pilot signal with pilot signal data stored in a pilot signal table 809 within memory 808. The pilot signal table 809 maintains a list of different pilot signals indexed against a particular rate set. A rate set is a collection of specific data rates available to the wireless communication network. Once the matching pilot signal has been determined by the comparator circuit 812 and the processor 807, a notation of the particular rate set is stored in one of the registers 805. Such a notation could be a flag, a variable value, or the like.

The transceiver circuit 802 provides a copy of the received wireless frame signal 800 to one or more decoder circuits 806. The particular decoder circuits 806 receive this copy of the wireless frame signal 800 and receive a decoding signal from the processor 807 based on the data rates provided in the identified rate set. The combination of these signals in the decoder circuits 806 results in decoding reverse rate information encoded within the wireless frame signal. The resulting reverse rate information is then also stored in one of the registers 805. The processor 807 retrieves the decoded reverse rate information from the registers 805 and uses that information to access a rate set database 810 stored on memory 808. The rate set database 810 maintains each rate set available to the wireless communication network along with each individual data rate contained within such rate sets. The processor 807 first retrieves the notation of which rate set was selected based on the detected pilot symbol. The processor 807 uses this rate set information to select the particular rate set within the rate set database 810, rate set table 809, for example. When the processor locates the identified rate set table 809, it then uses the reverse rate information decoded by decoder circuits 806 as an index to identify the particular data rate contained by the rate set table 809. Once the particular data rate has been identified by the processor 807, a decoding signal based on this particular data rate is provided to the decoder circuits 806 to decode the payload data from the wireless frame signal 800.

It should be noted that additional and/or alternative embodiments of the present teachings may implement all or any number of the hardware functionalities of the access node 80 in software. For example, software may be used to implement the functionality of the decoder circuits 806, the comparator circuit 812. In decoding a signal in software, code would be executed to convert the electrical signals of the signal to be decoded into its mathematical representation, as is known in the art. Thereafter, various mathematical processing may be applied to the signal representation to arrive at the decoded signal value. This decoded value may be stored as data on the memory 808 or converted to electrical signals for further hardware processing. Similarly, comparison logic is well known in the art. After converting the electrical signal into its mathematical representation, that representation is compared against the other mathematical representations stored in memory 808. Such additional and/or alternative embodiments are, thus, not limited only to decoding and comparing via hardware circuits.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof by execution of the program code defining such functions.

For a firmware and/or software implementation, the methodologies may be implemented with program code modules (e.g., procedures, functions, and so on) that perform the functions described herein. Any machine-readable medium tangibly embodying program code instructions may be used in implementing the methodologies described herein. For example, program code may be stored in a storage memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Figure 9:
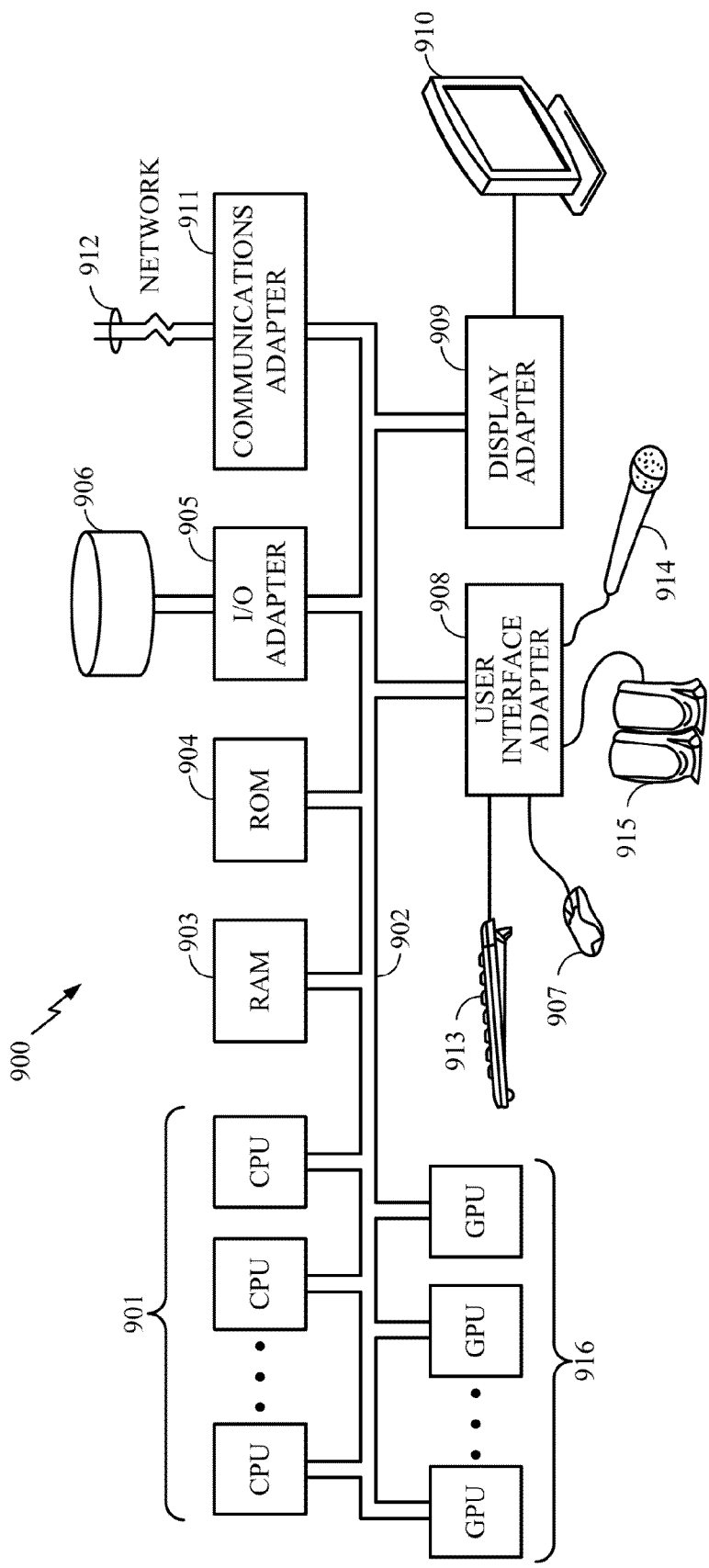
FIG. 9 illustrates an exemplary computer system which may be employed to implement the base stations and their operations therein according to certain embodiments.

FIG. 9 illustrates an exemplary computer system 900 which may be employed to implement the base stations and their operations therein according to certain embodiments. A central processing unit ("CPU" or "processor") 901 is coupled to a system bus 902. The CPU 901 may be any general-purpose processor. The present disclosure is not restricted by the architecture of the CPU 901 (or other components of the exemplary computer system 900) as long as the CPU 901 (and other components of the computer system 900) supports the inventive operations as described herein. As such, the CPU 901 may provide processing to the computer system 900 through one or more processors or processor cores. The CPU 901 may execute the various logical instructions described herein. For example, the CPU 901 may execute machine-level instructions according to the exemplary operational blocks described above in conjunction with FIGS. 4 and 6. When executing instructions representative of the operational blocks illustrated in FIGS. 4 and 6, the CPU 901 becomes a special-purpose processor of a special purpose computing platform configured specifically to operate according to the various embodiments of the teachings described herein.

The computer system 900 also includes a random access memory (RAM) 903, which may be SRAM, DRAM, SDRAM, or the like. The computer system 900 includes a read-only memory (ROM) 904 which may be PROM, EPROM, EEPROM, or the like. The RAM 903 and ROM 904 hold user and system data and programs, as is well known in the art.

The computer system 900 also includes an input/output (I/O) adapter 905, a communications adapter 911, a user interface adapter 908, and a display adapter 909. The I/O adapter 905, the user interface adapter 908, and/or the communications adapter 911 may, in certain embodiments, enable a user to interact with the computer system 900 in order to input information.

The I/O adapter 905 connects to a storage device(s) 906, such as one or more of hard drive, compact disc (CD) drive, floppy disk drive, tape drive, etc., to the computer system 900. The storage devices are utilized in addition to the RAM 903 for the memory requirements associated with saving the look up tables rate detection modules and the like. A communications adapter 911 is adapted to couple the computer system 900 to a network 912, which may enable information to be input to and/or output from the computer system 900 via the network 912 (e.g., the Internet or other wide-area network, a local-area network, a public or private switched telephony network, a wireless network, any combination of the foregoing). A user interface adapter 908 couples user input devices, such as a keyboard 913, a pointing device 907, and a microphone 914 and/or output devices, such as speaker(s) 915 to the computer system 900. A display adapter 909 is driven by the CPU 901 or by a graphical processing unit (GPU) 916 to control the display on the display device 910. The GPU 916 may be any various number of processors dedicated to graphics processing and, as illustrated, may be made up of one or more individual graphical processors. The GPU 916 processes the graphical instructions and transmits those instructions to the display adapter 909. The display adapter 909 further transmits those instructions for transforming or manipulating the state of the various numbers of pixels used by the display device 910 to visually present the desired information to a user. Such instructions include instructions for changing state from on to off, setting a particular color, intensity, duration, or the like. Each such instruction makes up the rendering instructions that control how and what is displayed on the display device 910.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present teachings. Accordingly, the appended claims are intended to include within their scope such processes, machines, manufacture, compositions of matter, means, methods, or steps.

What is claimed is:

1. A method for transmitting reverse link data rate information in a wireless communication system, said method comprising:
   determining a data rate for a reverse link transmission;
   determining a rate set, from a plurality of different rate sets, based on said data rate;
   selecting, at a mobile terminal, a first pilot signal from a plurality of pilot signals that each indicate one of the plurality of rate sets, each one of the plurality of rate sets including a plurality of data rates, said determined data rate being one of said plurality of data rates;
   deriving a rate code that identifies said determined data rate;

assembling a reverse link frame comprising at least said selected first pilot signal and said derived rate code; and transmitting said reverse link frame to an access node of said wireless communications system.

2. The method of claim 1 further comprising:

adding data and quality control measurement (QCM) information to said reverse link frame prior to said transmitting.

3. The method of claim 1 further comprising:

adding said rate code to each additional reverse link frame comprising data of a transmission packet.

4. The method of claim 1 wherein said first pilot signal, differentiates two rate sets of said plurality of rates sets from at least one other rate set of said plurality of rate sets.

5. The method of claim 4 wherein a second pilot signal, differentiates a third rate set of said plurality of rate sets from each other of said plurality of rate sets.

6. The method of claim 1 wherein said wireless communication system comprises one of:

a terrestrial system;
a satellite system; and
a hybrid terrestrial-satellite system.

7. The method of claim 1, in which assembling the reverse link frame comprises including at least one data block disposed adjacent to said pilot signal.

8. A method for decoding reverse link data transmissions in a wireless communication system, said method comprising:

receiving a frame transmitted by a mobile device;
detecting a pilot signal within said frame, said pilot signal identifying a rate set of a plurality of available different rate sets, said rate set including a plurality of data rates;
determining, based on said detected pilot signal, said rate set;
decoding reverse rate information within said frame;
selecting a data rate based on said decoded reverse rate information, said data rate being one of the plurality of data rates of said rate set; and
decoding data within said frame according to said selected data rate.

9. The method of claim 8 wherein said detected pilot signal is one of a plurality of available pilot signals.

10. The method of claim 9 wherein said rate set includes a plurality of data rates higher than data rates associated with other rate sets of said plurality of available rate sets.

11. The method of claim 10 wherein said rate set is associated with said reverse link data transmissions assigned to frequency division multiplexed (FDM) channels.

12. The method of claim 8 wherein said-differentiating comprises:

selecting, based on said pilot signal, two rate sets of said plurality of available rate sets.

13. The method of claim 12, further comprising:

blindly detecting said frame to distinguish said at least one rate set between a first of said two rate sets and a second of said two rate sets.

14. The method of claim 8, further comprising:

prior to said selecting said data rate, receiving at least one additional frame from said mobile device, wherein said frame and said at least one additional frame comprise a single data packet and wherein each of said at least one additional frame includes a copy of said reverse rate information;
coherently combining each said copy of said reverse rate information to reduce noise in said reverse rate information; and
responsive to said coherently combining each said copy, identifying said reverse rate information.

15. The method of claim 8 wherein said wireless communication system comprises one of:

a terrestrial system;
a satellite system; and
a hybrid terrestrial-satellite system.

16. An access node of a wireless communication system, said access node comprising:

a processor;
a modulator/demodulator coupled to said processor;
a transceiver coupled to said processor;
an antenna array coupled to said transceiver;
a storage memory coupled to said processor;
a rate detection module stored in said storage memory, wherein, when executed by said processor, said rate detection module configures said access node:
  to detect a pilot signal in a received frame, said pilot signal identifying a rate set of a plurality of available different rate sets, said rate set including a plurality of data rates; and;
  to identify said rate set associated with said detected pilot signal; and
a decoder module stored in said storage memory, wherein, when executed by said processor, said decoder module further configures said access node:
  to decode reverse rate information in said received frame, wherein said executing rate detection module further configures said access node to identify a data rate based on said decoded reverse rate information, said data rate being one of the plurality of data rates of said rate set; and
  to decode data within said frame using said identified data rate.

17. The access node of claim 16 wherein said wireless communication system comprises one of:

a terrestrial system;
a satellite system; and
a hybrid terrestrial-satellite system.

18. A non-transitory computer-readable medium including program code stored thereon, comprising:

program code to receive a frame transmitted by a mobile device;
program code to detect a pilot signal within said frame, said pilot signal identifying a rate set of a plurality of available different rate sets, said rate set including a plurality of data rates;
program code to determine said rate set identified by said pilot signal;
program code to decode reverse rate information within said frame;
program code to select a data rate based on said decoded reverse rate information, said data rate being one of the plurality of data rates of said rate set; and
program code to decode data within said frame according to said selected data rate.

19. The computer-readable medium of claim 18 wherein said detected pilot signal is one of a plurality of available pilot signals.

20. The computer-readable medium of claim 19 wherein said rate set includes a plurality of data rates greater than data rates associated with other rate sets of said plurality of available rate sets.

21. The computer-readable medium of claim 20 wherein said rate set is associated with said reverse link data transmissions assigned to frequency division multiplexed (FDM) channels.

22. The computer-readable medium of claim 18 wherein said program code to determine said rate set comprises:
   program code to select, based on said pilot signal, two rate sets of said plurality of available rate sets.

23. The computer-readable medium of claim 22 further comprising:
   program code to blindly detect said frame to distinguish said at least one rate set between a first of said two rate sets and a second of said two rate sets.

24. The computer-readable medium of claim 18 further comprising:
   program code, to receive at least one additional frame from said mobile device, wherein said frame and said at least one additional frame comprise a single data packet and wherein each of said at least one additional frame includes a copy of said reverse rate information;
   program code to coherently combine each said copy of said reverse rate information to reduce noise in said reverse rate information; and
   program code, executable responsive to execution of said program code to coherently combine each said copy, to identify said reverse rate information.

25. The computer-readable medium of claim 18 wherein said wireless communication system comprises one of:
   a terrestrial system;
   a satellite system; and
   a hybrid terrestrial-satellite system.

26. A system for decoding reverse link data transmissions in a wireless communication system, said system comprising:
   means for receiving a frame transmitted by a mobile device;
   means for detecting a pilot signal within said frame, said pilot signal identifying a rate set of a plurality of available rate sets, said rate set including a plurality of data rates;
   means for determining said rate set identified by said pilot signal;
   means for decoding reverse rate information within said frame;
   means for selecting a data rate based on said decoded reverse rate information, said data rate being one of the plurality of data rates of said rate set; and
   means for decoding data within said frame according to said selected data rate.

* * * * *